(12) United States Patent
Jung

(10) Patent No.: US 7,990,205 B2
(45) Date of Patent: Aug. 2, 2011

(54) SEMICONDUCTOR INTEGRATED CIRCUIT WITH SWITCHING VARIABLE RESISTANCE DEVICE

(75) Inventor: Dong-Il Jung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 88 days.

(21) Appl. No.: 12/460,047

(22) Filed: Jul. 13, 2009

(65) Prior Publication Data

US 2010/0026374 A1 Feb. 4, 2010

(30) Foreign Application Priority Data

Jul. 29, 2008 (KR) ........................ 10-2008-0073890

(51) Int. Cl.
*G05F 1/10* (2006.01)
*G05F 3/00* (2006.01)
(52) U.S. Cl. ...................................... 327/536
(58) Field of Classification Search .................. 327/536; 363/59–60
See application file for complete search history.

(56) References Cited

U.S. PATENT DOCUMENTS

| 2007/0176671 A1* | 8/2007 | Ishida ........................... 327/536 |
| 2007/0194834 A1* | 8/2007 | Sohara et al. ................. 327/536 |
| 2007/0206338 A1 | 9/2007 | Ishino |

FOREIGN PATENT DOCUMENTS

| JP | 2001-284971 | 10/2001 |
| JP | 2007-73841 | 3/2007 |
| KR | 10-2007-0051319 | 5/2007 |

* cited by examiner

Primary Examiner — Quan Tra
(74) Attorney, Agent, or Firm — Mills & Onello, LLP

(57) ABSTRACT

A semiconductor integrated circuit having a switching variable resistance device with combined functions of a switching device and a variable resistance device is provided. The semiconductor integrated circuit includes a supply voltage input terminal that receives a supply voltage, a pulse generating unit that receives an input pulse and generates a variable amplitude pulse in response to the input pulse during a period of time, and a switching variable resistance unit that controls a current flowing into the supply voltage input terminal in response to the variable amplitude pulse, thereby limiting an inrush current and thus substantially reducing an temporary unstable effect on the supply voltage, which may be supplied from a power source.

12 Claims, 16 Drawing Sheets

SEMICONDUCTOR INTEGRATED CIRCUIT WITH SWITCHING VARIABLE RESISTANCE DEVICE

CROSS-REFERENCE TO RELATED APPLICATIONS

This application claims the benefit of Korean Patent Application 10-2008-0073890, filed on Jul. 29, 2008, the contents of which are hereby incorporated by reference in their entirety as if fully set forth herein.

BACKGROUND

A DC-DC converter converts a source of direct current (DC) from an input voltage to a desired output voltage and may be provided in various applications, such as those particularly important applications related to the rapidly changing information communications field.

In a DC-DC converter configured as a charge pump converter having a voltage doubler circuit, a supply voltage supplied from a power supply unit of a storage device, such as a battery, etc. may become temporarily unstable due to a high amount of inrush current flowing into the circuit in an initial operation, such as a start-up operation, for example, when powering up a device comprising the voltage doubler circuit. Such an unstable effect may have an undesirable influence on the operation of other adjacent circuits and may be a factor of shortening the life of the battery.

It is therefore preferable to develop an enhanced technology to enable a resistance value to be increased to a greater value when a relatively low switching current is needed in an initial operation and to enable a resistance value to be decreased to a smaller value when a relatively high switching current is needed after the initial operation, without a significant change in components or circuit configuration.

SUMMARY OF THE INVENTION

The present invention relates to semiconductor integrated circuits, and more particularly, to a semiconductor integrated circuit having a switching variable resistance unit with all functions of both a switching device and a variable resistance device.

In accordance with an aspect of the invention, a semiconductor integrated circuit comprises a supply voltage input terminal that receives a supply voltage; a pulse generating unit that receives an input pulse and generates a variable amplitude pulse in response to the input pulse during a period of time; and a switching variable resistance unit that controls a current flowing into the supply voltage input terminal in response to the variable amplitude pulse.

In an embodiment, the switching variable resistance unit comprises a PMOS transistor having a source terminal that is coupled to the supply voltage input terminal and a gate terminal that receives the variable amplitude pulse. In an embodiment, the PMOS transistor switches and variably limits the current flowing into the supply voltage input terminal.

In an embodiment, the variable amplitude pulse of the pulse generating unit progressively increases during the period of time.

In an embodiment, the switching variable resistance unit comprises an NMOS transistor having drain terminal that is coupled to the supply voltage input terminal and a gate terminal that receives the variable amplitude pulse.

In accordance with another aspect, a charge pump for use in a semiconductor integrated circuit comprises a supply voltage input terminal that receives a supply voltage; a pulse generating unit that receives an input clock and generates first and second non-overlapping pulses in response to the input clock, and that generates first and second variable amplitude pulses that correspond to the first and second non-overlapping pulses, respectively; a first switching variable resistance unit that controls a current flowing into the supply voltage input terminal in response to the first variable amplitude pulse; a second switching variable resistance unit that controls the current flowing into the supply voltage input terminal in response to the second variable amplitude pulse; a first capacitor coupled between output terminals of the first and second switching variable resistance units; a first switching unit coupled between an output terminal of the second switching variable resistance unit and a ground, and responding to the first non-overlapping pulse; a second switching unit coupled between an output terminal of the first switching variable resistance unit and a load output terminal, and responding to the second non-overlapping pulse; and a second capacitor coupled between the load output terminal and the ground.

In an embodiment, the first and second switching variable resistance units each comprise first and second PMOS transistors having source terminals that are coupled in common to the supply voltage input terminal and gate terminals that each receive the first and second variable amplitude pulses.

In an embodiment, the first and second PMOS transistors switch and variably limit the current flowing into the supply voltage input terminal.

In an embodiment, the first and second variable amplitude pulses of the pulse generating unit have progressively increasing amplitudes.

In an embodiment, the first switching unit comprises an NMOS transistor.

In an embodiment, the second switching unit comprises a PMOS transistor.

In an embodiment, the charge pump is employed in a DC-DC converter of a mobile communication terminal.

In an embodiment, a maximum amplitude and a minimum amplitude of the first and second variable amplitude pulses of the pulse generating unit correspond to a supply voltage and a ground voltage, respectively, and are each generated having an amplitude to enable a variable resistance value of the first and second switching variable resistance units to become smaller during phases of an operation.

In an embodiment, the charge pump is employed in a direct current converter of a portable electronic device.

In an embodiment, the charge pump receives the supply voltage as an input and, in response, generates and sends a voltage twice that of the supply voltage to the load output terminal.

In an embodiment, the first and second variable amplitude pulses are generated by a level converter, and the level converter comprises a comparator that compares an output feedback signal with a predetermined reference signal, and, in response, generates a comparison output; an OR gating unit that gates the comparison output and a time state signal, and, in response, generates an OR response; an AND gating unit that gates the OR response and the first and second non-overlapping pulses and, in response, generates an AND response; a PMOS transistor that applies a supply power to an output terminal in response to a first state of the first and second non-overlapping pulses; and an NMOS transistor having a drain-source channel that is coupled between the output terminal and the ground and a gate terminal that receives the AND response.

In an embodiment, the time state signal includes at least three different predetermined time state signals.

In accordance with another aspect, a method of limiting an inrush current flowing into a voltage doubler comprised of a charge pump, the method comprises generating a variable amplitude pulse in response to an input pulse; and applying the variable amplitude pulse to a gate of a MOS transistor coupled to the supply voltage input terminal so as to perform switching of the MOS transistor and changing of the variable resistance value of the MOS transistor, thereby limiting the inrush current.

In an embodiment, the MOS transistor performs a turnoff/slightly turn on operation, a turnoff/intermediate turn on operation, and a turnoff/fully turn on operation according to a period of time, to reduce its variable resistance value.

In an embodiment, the MOS transistors comprise at most two or less MOS transistors.

Accordingly, in some embodiments of the invention, an inrush current applied to a semiconductor integrated circuit or charge pump is limited, thereby substantially reducing an effect that a supply voltage supplied from a power source such as a battery becomes temporarily instable.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF EMBODIMENTS

Figure 1:
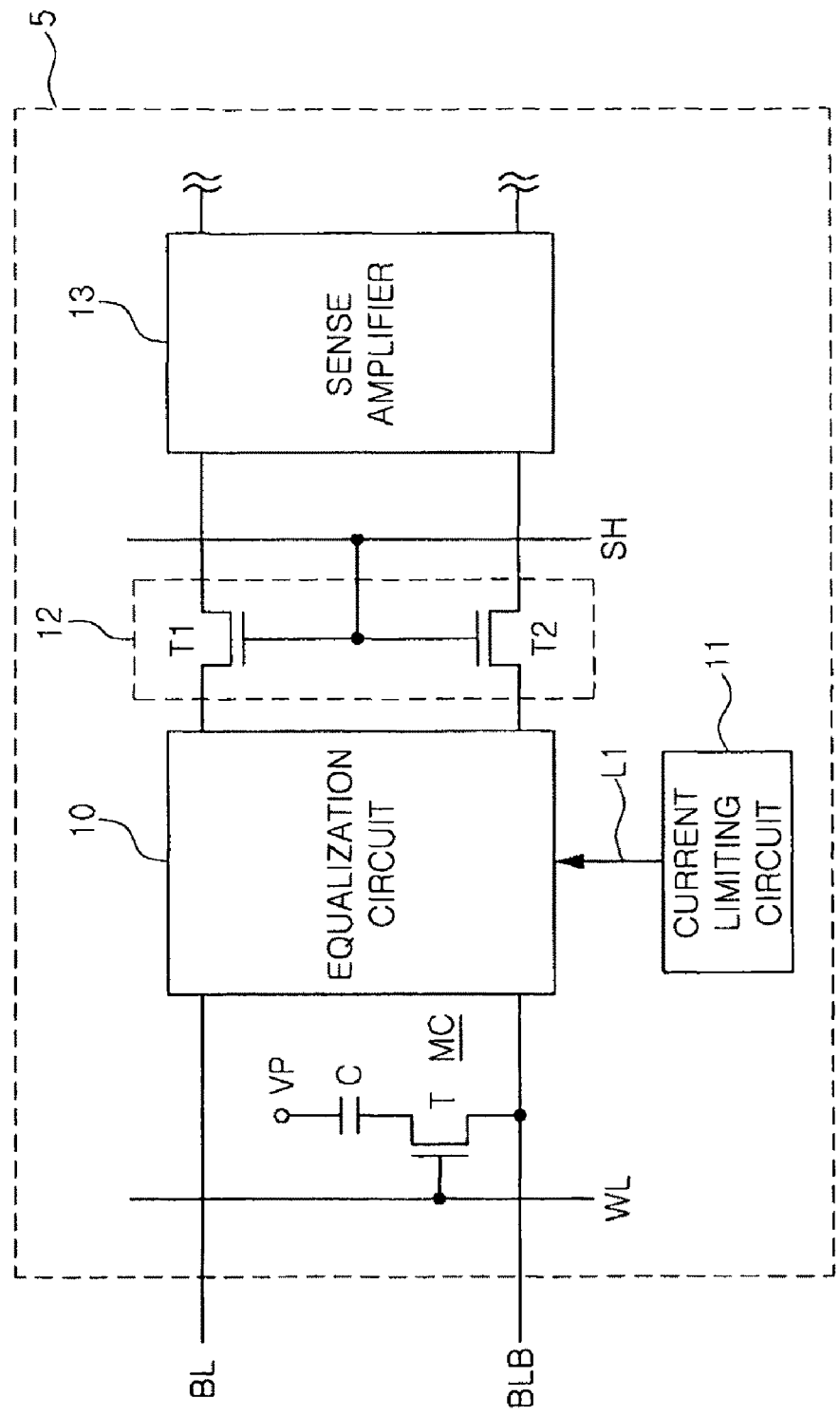
FIG. 1 is a block diagram of a semiconductor memory device having a current limiting circuit.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather these embodiments are provided so that this disclosure will be thorough and complete, and will fully convey the inventive scope to those skilled in the art. Accordingly, for clarity, a detailed description for operation of known charge pump circuit, on/off operation of MOS transistors and unstable effect of a circuit from an inrush current etc., has been omitted.

Unless otherwise defined, all terms (including technical and scientific terms) used herein have the same meaning as commonly understood by one skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. Embodiments of the present invention are more fully described below with reference to the accompanying drawings. This invention may, however, be embodied in many different forms and should not be construed as being limited to the embodiments set forth herein; rather, these embodiments are provided so that this disclosure is thorough and complete, and conveys the inventive concept to those skilled in the art.

It will be understood that, although the terms first, second, etc. are to be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

In accordance with some embodiments of the invention, a semiconductor integrated circuit comprising a switching variable resistance unit with all functions of a switching device and a variable resistance device will be described as follows, with reference to the accompanying drawings.

For a thorough understanding of the operations and functions according to some embodiments of the invention, various general technologies are described in more detail as follows.

Figure 2:
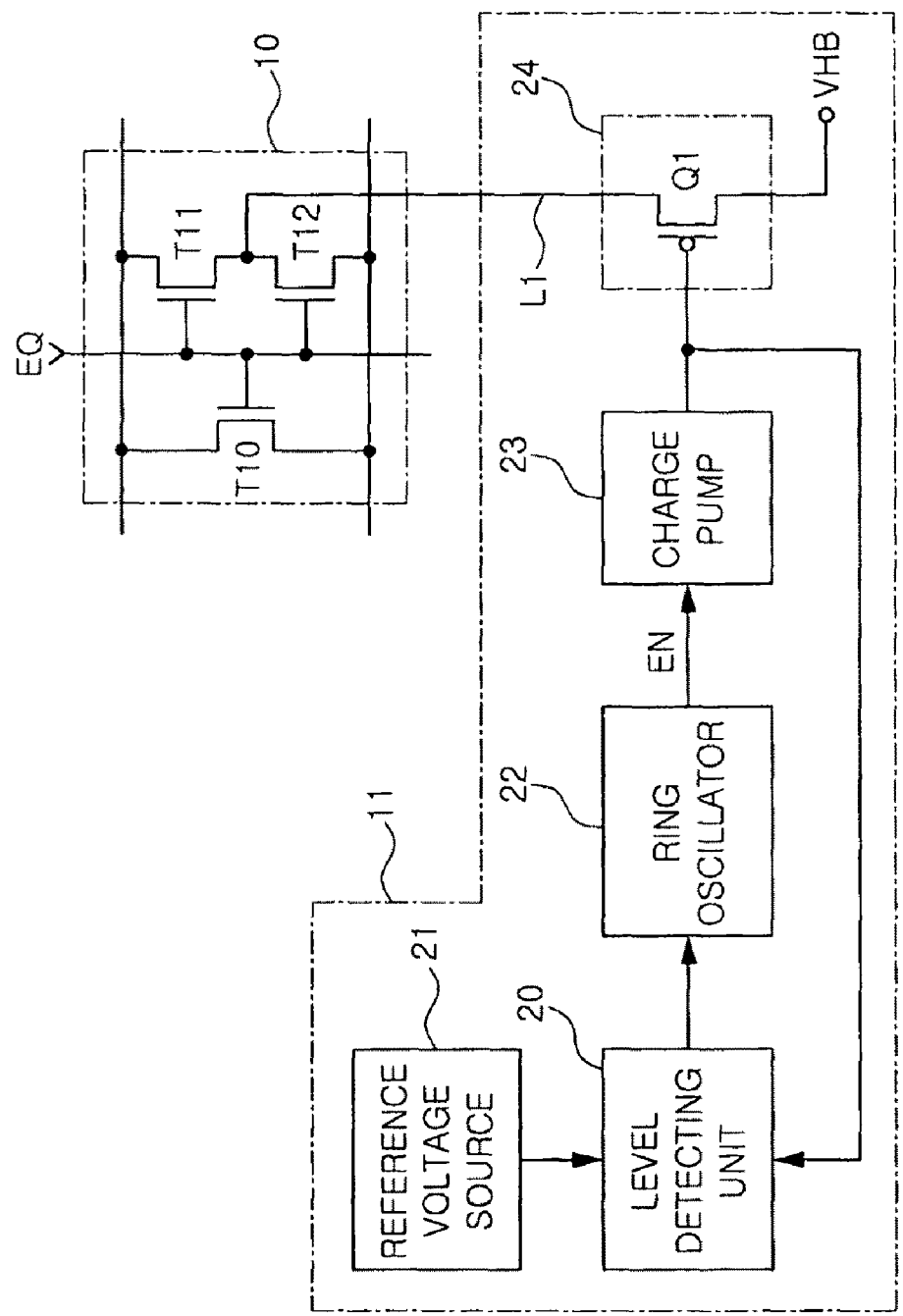
FIG. 2 is a block diagram of the current limiting circuit referred to in FIG. 1 controlling a current supplied to an equalization circuit.

FIG. 1 is a block diagram of a semiconductor memory device 5 having a current limiting circuit 11, and FIG. 2 is a block diagram of the current limiting circuit 11 referred to in FIG. 1 controlling a current supplied to an equalization circuit 10 of the semiconductor memory device 5, according to embodiments of the invention.

Referring to FIG. 1, the current limiting circuit 11 is coupled to the equalization circuit 10 of the semiconductor memory device 5 to limit a current supplied to the equalization circuit 10. In addition to the equalization circuit 10, the semiconductor memory device 5 comprises a unit memory cell MC, a switching circuit 12, and a sense amplifier 13. In an embodiment, the current limiting circuit 11 is external to the semiconductor memory device 5. In another embodiment, the semiconductor memory device 5 comprises the current limiting circuit 11. The unit memory cell MC is comprised of an access transistor T and a storage capacitor C. A gate terminal of the access transistor T is coupled to a word line WL, and a drain terminal thereof is coupled to a bit line bar BLB of a bit line pair that is coupled to the equalization circuit 10. The current limiting circuit 11 is coupled to the equalization circuit 10 to limit a current supplied to the equalization circuit 10. The switching circuit 12 includes NMOS transistors T1 and T2. If a shield signal SH is applied to gates of the NOMS transistors T1 and T2, the NOMS transistors are turned off so as to electrically isolate the sense amplifier 13 from a pair of bit lines corresponding to the sense amplifier 13.

With reference to FIG. 2, the current limiting circuit 11 is comprised of a reference voltage source 21, a level detecting unit 20, a ring oscillator 22, a charge pump 23 and a transistor unit 24. The equalization circuit 10 is comprised of transistors T10, T11, and T12, and performs an equalizing operation on a corresponding pair of bit lines in response to an equalization signal EQ applied to gates of the transistors T10, T11, and T12. The transistors of the equalization circuit 10 may be n-type MOS transistors. The transistor unit 24 may comprise a PMOS transistor Q1.

A level of current provided to the equalization circuit 10 through a line L1 of the transistor unit 24 is controlled by a voltage that is output from the charge pump 23; specifically, an output terminal of the charge pump 23 that is coupled to the transistor unit 24. The charge pump 23 operates in response to an enable signal EN from the ring oscillator 22. For example, the charge pump 23 may operate when the enable signal EN has a logic high level. The output terminal of the charge pump 23 may be coupled to a gate terminal of the PMOS transistor Q1 of the transistor unit 24. A drain terminal of the PMOS transistor Q1 may receive a bit line precharge voltage VHB which is applied to the PMOS transistor in a manner known to one of ordinary skill in the art, for example, by a pre-charge circuit.

Here, when a load of the equalization circuit 10 is relatively great, for example, during a power-up operation, the charge pump 23 is required to internally limit an amount of inrush current to the semiconductor memory device 5, thus permitting the charge pump 23 to provide a stable output voltage.

Figure 3:
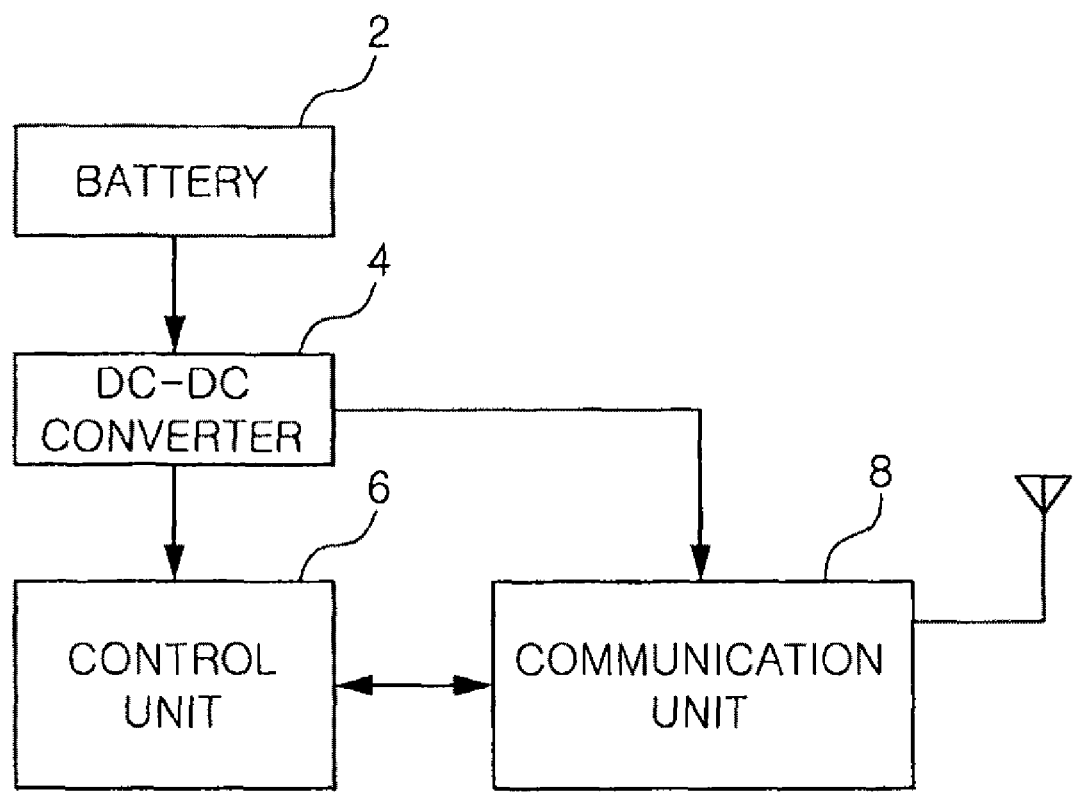
FIG. 3 is a block diagram schematically illustrating a mobile communication terminal system.

FIG. 3 is a block diagram schematically illustrating a mobile communication terminal system. Referring to FIG. 3, the mobile communication terminal system comprises a battery 2, a DC-DC converter 4, a control unit 6, and a communication unit 8. The mobile communication terminal system of FIG. 3 may be included in electronic devices such as mobile phones, PDAs, portable multimedia players, notebook computers, or other devices known to those of ordinary skill in the art that provide mobile communications operations.

The control unit 6 operates by receiving an operating power from the DC-DC converter 4 in order to control the communication unit 8 to perform mobile communications. The DC-DC converter 4 may receive power from the battery 2 and, due in large part to the charge pump, generates a sufficient DC voltage for the control unit 6 and the communication unit 8 to operate. However, a high inrush current may be received by the DC-DC converter 4 in an initial operation of the mobile communication terminal system, since the load on the DC-DC converter 4 is relatively great. For example, when the inrush current cannot be appropriately controlled, the battery 2 can be drained or otherwise quickly consumed of its stored charge. Subsequently, the life of the battery may be shortened, and other peripheral circuits coupled to the battery 2 may be affected by the inrush current, which may have an undesirable influence on the operation of the system. It is therefore, required to appropriately limit such inrush current through a relatively simplified device.

Figure 4:
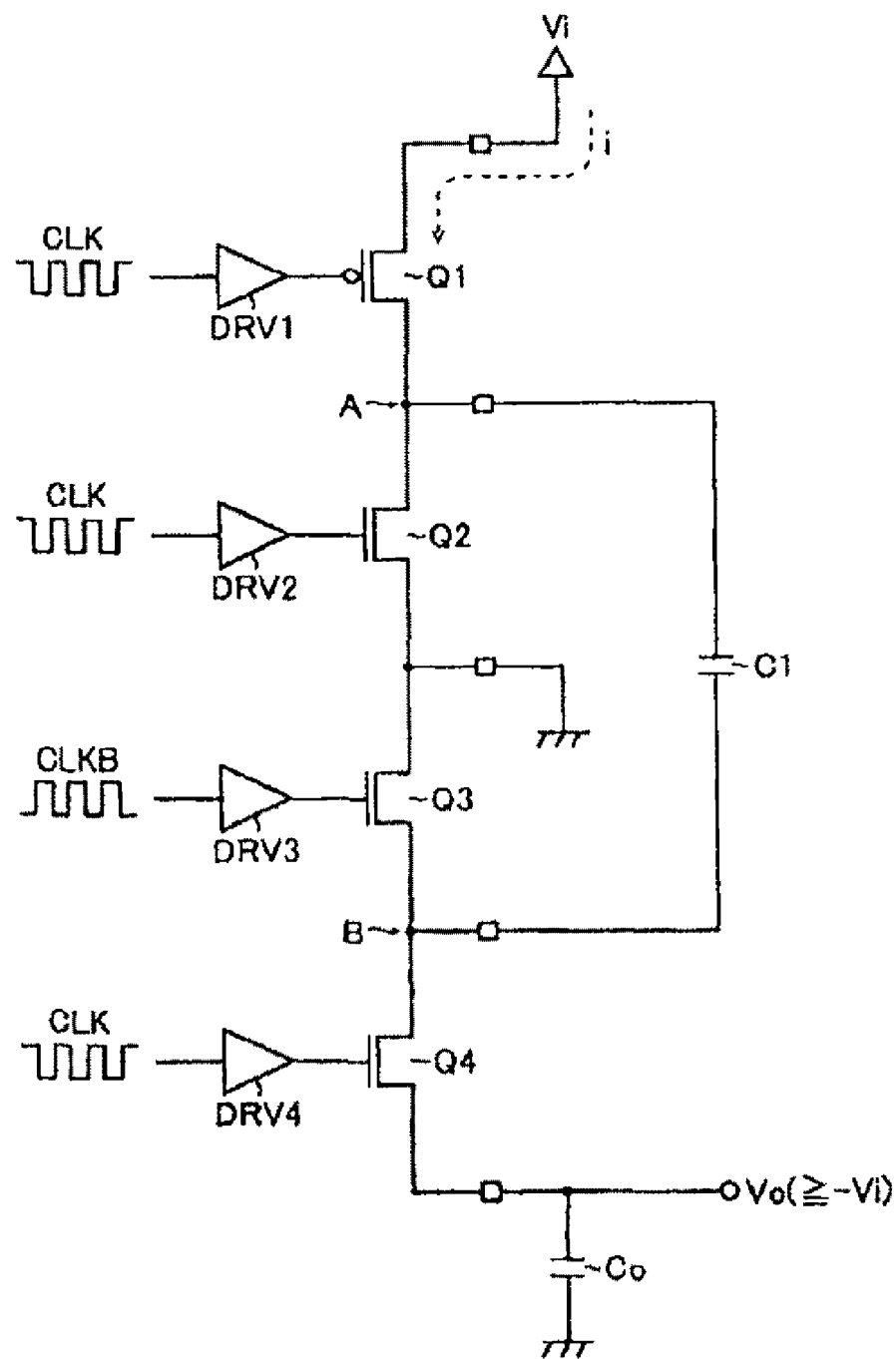
FIG. 4 is a diagram of a charge pump that limits or prevents an inrush current.
Figure 5:
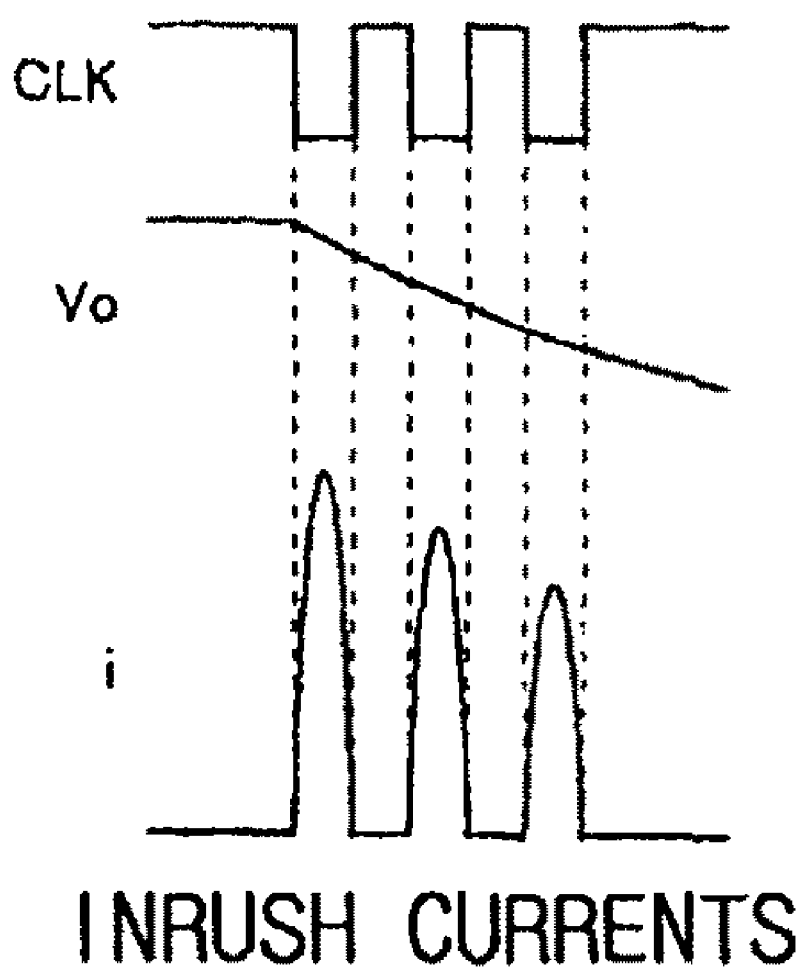
FIG. 5 is a graph illustrating the limiting or prevention of an inrush current through the charge pump of FIG. 4.
Figure 6:
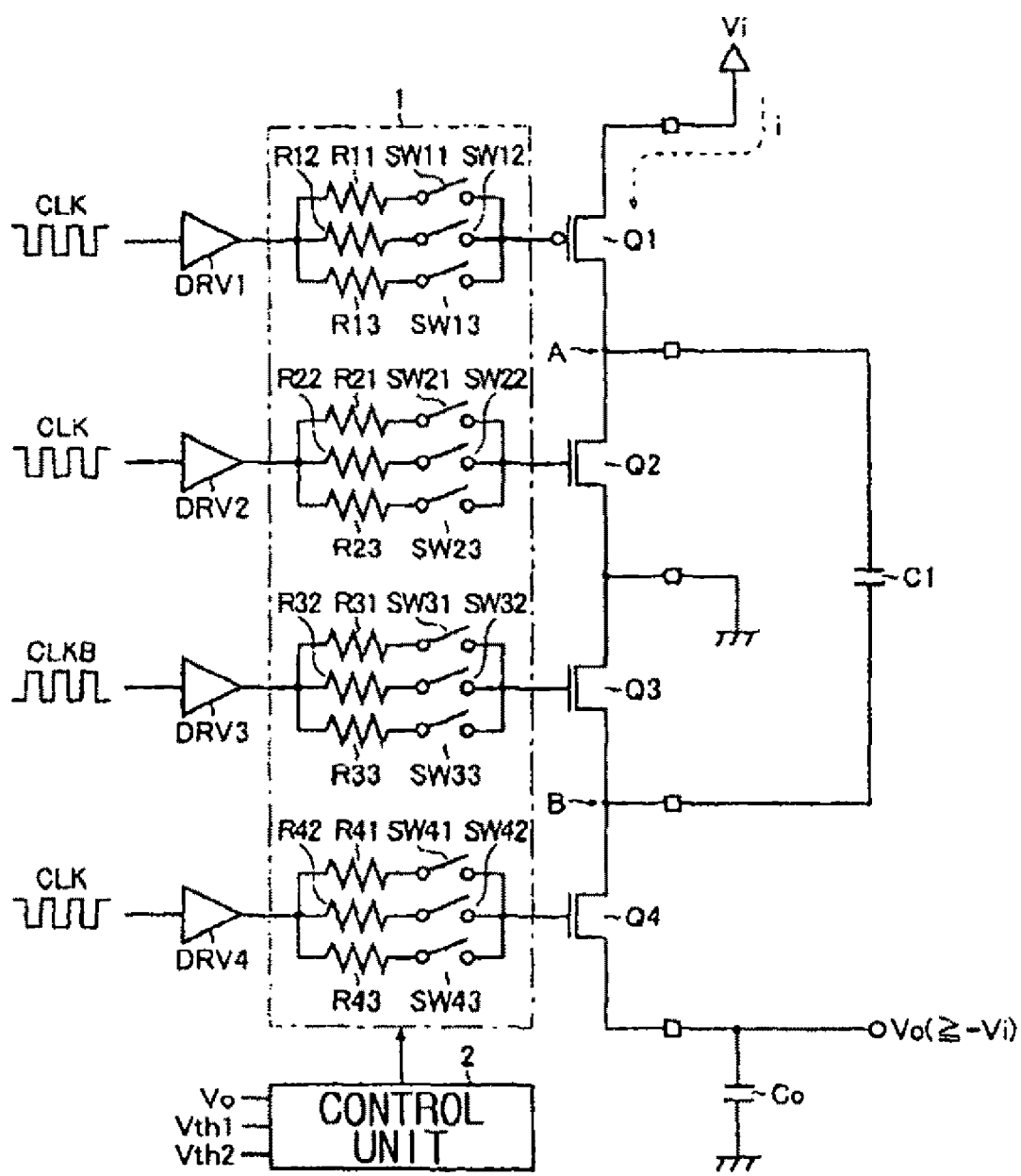
FIG. 6 is a diagram of a charge pump comprising a slew rate switching unit.

FIG. 4 is a diagram of a charge pump that limits or prevents an inrush current. FIG. 5 is a graph illustrating the limiting or prevention of an inrush current through the charge pump of FIG. 4. FIG. 6 is a diagram of a charge pump comprising a slew rate switching unit. The charge pumps illustrated in FIGS. 4 and 6 can be applied to the current limiting circuit described with respect to FIGS. 1 and 2, and can be included in the mobile communication terminal system described with respect to FIG. 3. When a charge pump shown in FIG. 4 or 6 is applied to the current limiting circuit described with respect to FIGS. 1 and 2, the enable signal EN may be applied to each of drivers DRV1 to DRV4 of the corresponding charge pump. In order to apply the enable signal EN to the drivers, each of the drivers should have a separate signal input terminal. In that event, when the enable signal EN has a logic high level, each driver may operate.

The charge pump of FIG. 4 may comprise a plurality of drivers DRV1-DRV4 and a plurality of charge transmitting transistors Q1-Q4 that are each coupled to a corresponding driver DRV1-DRV4, and that are periodically activated and deactivated by a clock signal CLK and an inverted clock signal CLKB. The charge pump further comprises a charge-accumulating capacitor C1 that is coupled to a node A between transistors Q1 and Q2, and coupled to a node B between transistors Q3 and Q4 and that performs charging and discharging of a charge. The charge pump further comprises an output voltage accumulating capacitor Co that receives an input voltage Vi and generates a desired output voltage Vo($\geq$−Vi). The output voltage Vo may be optionally predetermined in a range of −Vi$\leq$Vo$\leq$0.

In order for the output voltage accumulating capacitor Co to generate the output voltage Vo, charge transmitting transistors Q1 and Q3 are first turned on, and charge transmitting transistors Q2 and Q4 are turned off in response to clock signals CLK, CLKB. By switching transistors Q1-Q4 in this manner, input voltage Vi is provided at node A of the capacitor C1 through the activated charge transmitting transistor Q1, and node B of the capacitor C1 is at ground level. Thus, the capacitor C1 is charged until a potential difference of both ends of the capacitor C1 becomes the same as the input voltage Vi. After the capacitor C1 is completely charged, the transistors Q1 and Q3 are turned off, and the transistors Q2 and Q4 are turned on. By such switching, node A is at a ground level through transistor Q2. Then, a potential of node A may be reduced from the input voltage Vi to a ground voltage GND. Here, a potential difference approximately equal to the input voltage Vi is generated between both ends of the capacitor C1 by the previously charged capacitor C1. Thus, when a voltage potential change occurs at node A, the voltage at node B may be reduced from the ground voltage GND to a negative voltage −Vi. At this time, node B is in a conductive state with respect to output terminal Vo via transistor Q4. Thus, a charge of the capacitor C1 flows from capacitor C1 to output capacitor Co through activated transistor Q4. Thus, the voltage Vo at the output terminal may be reduced to the negative voltage −Vi.

A slew rate switching unit 1 controlled by a control unit 2 as shown in FIG. 6 can be employed to prevent an operation of the charge pump from being unstable when an inrush current (i), for example, as shown in the graph of FIG. 5, is applied to the charge pump.

With reference to FIG. 6, charge pump is configured to include a plurality of charge transmitting transistors Q1 to Q4 that are turned on/off periodically by clock signals and a charge-accumulating capacitor C1 that performs charging and discharging based on the switching operation of the charge transmitting transistors Q1 to Q4 to generate a desired output voltage by receiving an input voltage. The slew rate switching unit 1 shown in FIG. 6 switches a slew rate provided when transferring the clock signals to the charge transmitting transistors Q1 to Q4, and a control unit 2 controls the slew rate switching unit 1 to switch the slew rate according to a level of the output voltage Vo.

In FIG. 6, the slew rate switching unit 1 is coupled to a gate terminal of the transistor Q1, and comprises a first series circuit comprised of a resistor R 11 and a switch SW11, a second series circuit comprised of a resistor R12 and a switch SW12, and a third series circuit comprised of a resistor R13 and a switch SW13, wherein the first, second, and third series circuits are coupled in parallel with one another. Accordingly, a stable voltage operation and an inrush current limiting operation can both be attained by controlling the configuration of the switches SW11, SW12 and SW13. However, in the circuit shown in FIG. 6, there is a need to install a plurality of the resistance circuits and switches for every respective charge transmitting transistor, requiring additional hardware.

Figure 7:
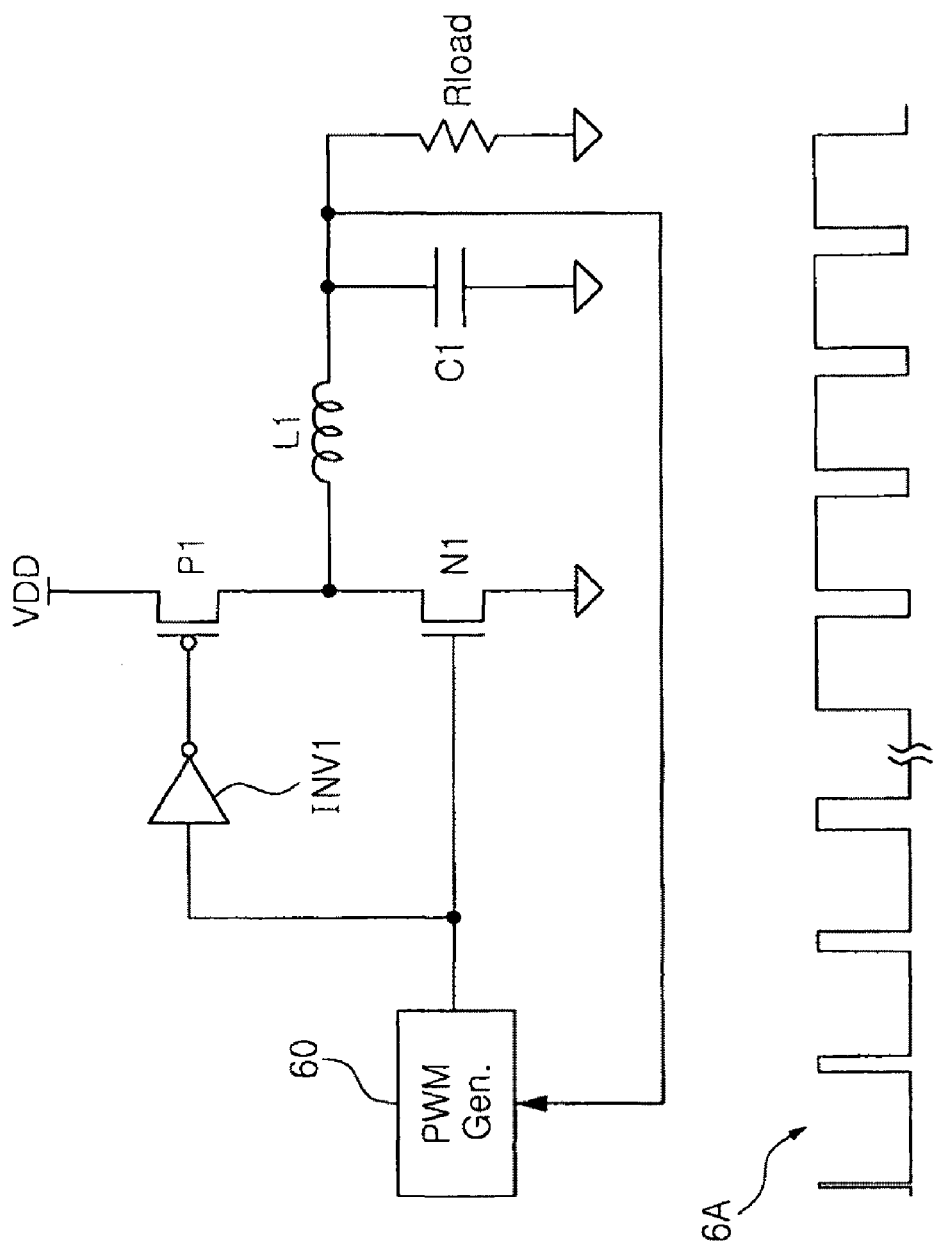
FIGS. 7 to 9 are circuit diagrams of simple converter circuits.
Figure 8:
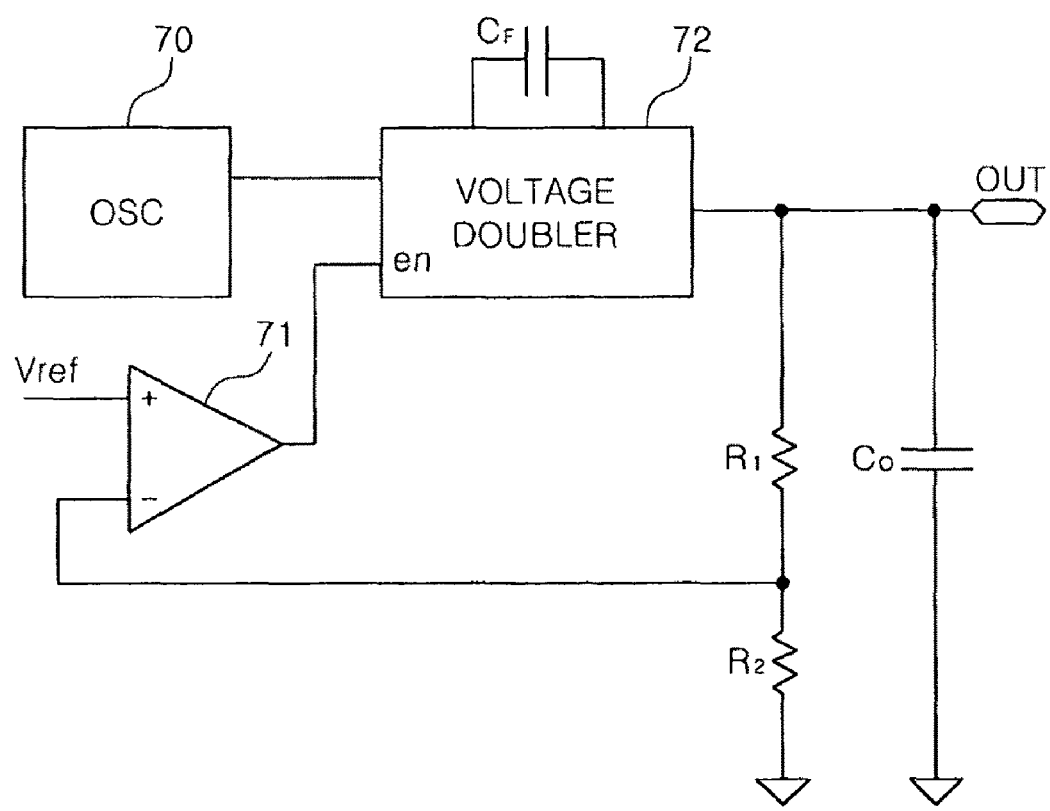
Figure 9:
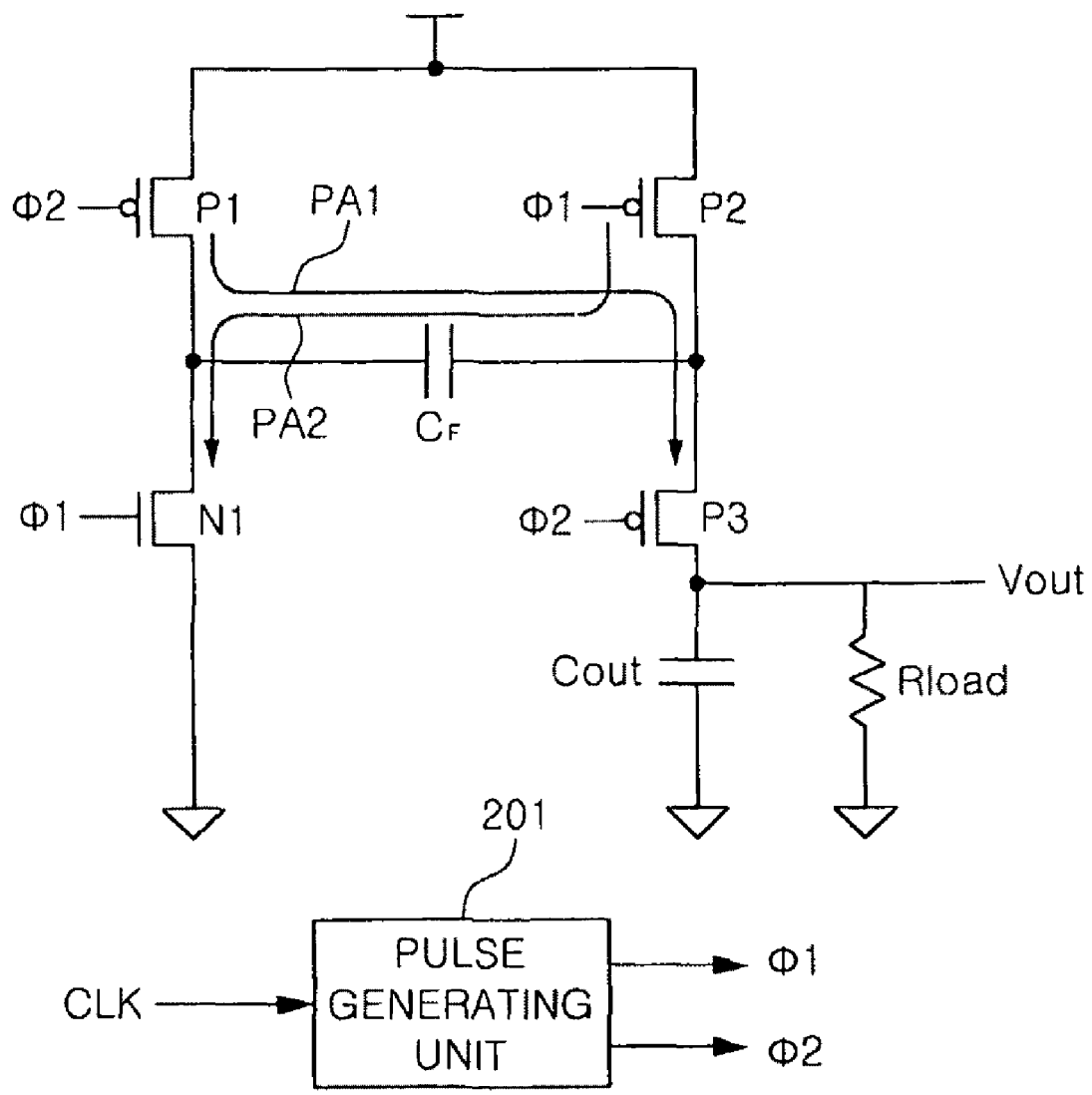

FIGS. 7 to 9 are circuit diagrams of simple power converter circuits. In particular, FIG. 7 is a diagram of a configuration of a buck converter, FIG. 8 is a block diagram of charge pump having a voltage doubler, and FIG. 9 is a diagram of a voltage doubler circuit shown in FIG. 8. The converter circuits can be DC-DC voltage converters such as those described herein, which in an initial operation can step down (or buck) a voltage applied to a battery during charging of the battery.

Referring to FIG. 7, a general buck converter comprises MOS transistors P1 and N1, inverter INV1, inductor L1, capacitor C1 and a pulse width modulation (PWM) generator 60 that generates a pulse width modulation signal. In a lower part of FIG. 7, an output signal 6A generated by the PWM generator 60 is shown.

In an initial operation, an output voltage supplied to a load Rload becomes 0V, and at this time, MOS transistors P1 and N1 functioning as switching devices are driven by receiving a pulse signal as a left signal of output signal 6A having a relatively small duty ratio, as indicated by the width of the leftmost pulse signal relative to subsequent pulse signals of output signal 6A. For example, when the output voltage progressively increases and thus drives the load Rload with a relatively greater current, the MOS transistors P1 and N1 receive a pulse signal having a relatively higher duty ratio. By switching the increased output voltage across the load with the higher duty ratio, a drop effect of the output voltage caused by the increased current can be substantially reduced or prevented or otherwise controlled by substantially increasing a duty ratio, thereby increasing an output efficiency.

In controlling a flow of current by using a pulse width modulation (PWM) signal as shown in FIG. 7, the PWM generator 60 is required. However, the use of a pulse width modulation signal in an inductor-based switching circuit has inherent limitations, wherein it may be preferable to use a step-up regulated charge pump.

Referring to FIG. 8, a charge pump circuit comprises an oscillator 70, a comparator 71, resistors R1 and R2, capacitors $C_F$ and Co, and a voltage doubler circuit 72. The charge pump circuit is provided as a boost converter that, unlike the configuration described with regard to FIG. 7, does not require an inductor and can provide an output higher than a power source voltage and approximate a direct current. The charge pump circuit can supply a current for a given load level without a voltage change; that is, the output can be used to power other circuits.

In FIG. 8, the voltage doubler circuit 72 charges the capacitor $C_F$ by receiving a clock that is output from the oscillator 70, and the capacitor $C_F$ performs a discharge to the output capacitor Co, and thus a voltage of the capacitor Co is maintained to be twice that of the power source voltage. In this case, the comparator 71 compares a divided voltage between resistors R1 and R2 of an output voltage OUT to an applied reference voltage Vref to determine whether the divided voltage is higher than the reference voltage Vref. When the divided voltage of the output voltage OUT exceeds the reference voltage Vref, the voltage doubler 72 is disabled by an output signal of the comparator 71 that is provided to an input (en) of the voltage doubler 72, and when the divided voltage is below the reference voltage Vref, the voltage doubler 72 is enabled. In this manner, the output voltage OUT follows the reference voltage Vref. As shown in FIG. 8, the divided voltage of the output voltage OUT is applied to an inverted terminal (−) of the comparator 71 from a medium node between resistors R1, R2 coupled sequentially between the output voltage OUT and a ground.

A detailed configuration of the voltage doubler circuit 72 referred to in FIG. 8 is shown in FIG. 9.

With reference to FIG. 9, the voltage doubler circuit comprises NMOS and PMOS transistors N1, P1, P2 and P3, capacitors $C_F$ and Cout, and a pulse generating unit 201.

In the beginning of the operation of the circuit shown in FIG. 9, capacitors $C_F$ and Cout have no charge. Thus, the output voltage supplied to load Rload becomes 0V. In the initial state, when PMOS and NMOS transistors P2 and N1 are turned on in response to a first pulse Φ1 provided by the pulse generating unit 201 and PMOS transistors P1 and P3 are turned off, current flows through a current path PA2 and the capacitor $C_F$ having a first node in the current path PA2 begins to charge. Subsequently, when the PMOS and NMOS transistors P2 and N1 are turned off in response to the second pulse Φ2 provided by the pulse generating unit 201 and the PMOS transistors P1 and P3 are turned on, a current path PA1 opposite to the current path PA2 is formed and then the output capacitor Cout is charged. Since the capacitor retains the first voltage across it (received via the first node), the second voltage applied to the capacitor $C_F$ via the second node is added to the first voltage, and therefore, a power source voltage is twice provided to the capacitor $C_F$ (via both nodes), the voltage of the output capacitor Cout can be charged to twice that of the power source voltage.

However, since a large amount of current is needed at a time during the charging of the capacitors $C_F$ and Cout in the initial operation state of the circuit, a large amount of inrush current flows into the circuit. However, when the inrush current cannot be appropriately controlled, a power supply device of a battery etc. can become overloaded, thereby shortening a life of the battery and affecting an operation of other adjacent circuits coupled to the battery. In this case, it is required to appropriately limit a relatively large amount of inrush current generated in the initial operation by using a relatively simplified device. In particular, as shown in FIG. 9, inrush current flows alternately along both current paths PA1 and PA2.

As described above, when a problem occurs with regard to the inrush current, the inrush current can be limited by using a device having a relatively great resistance value in an initial operation requiring a relatively small amount of switching current. Furthermore, in a subsequent operation that requires a relatively large amount of switching current, it may be beneficial to substantially increase a current supply by using a resistance device having a very small resistance value.

Embodiments of the invention will be described in detail with regard to FIGS. 10 to 16, as follows.

Figure 10:
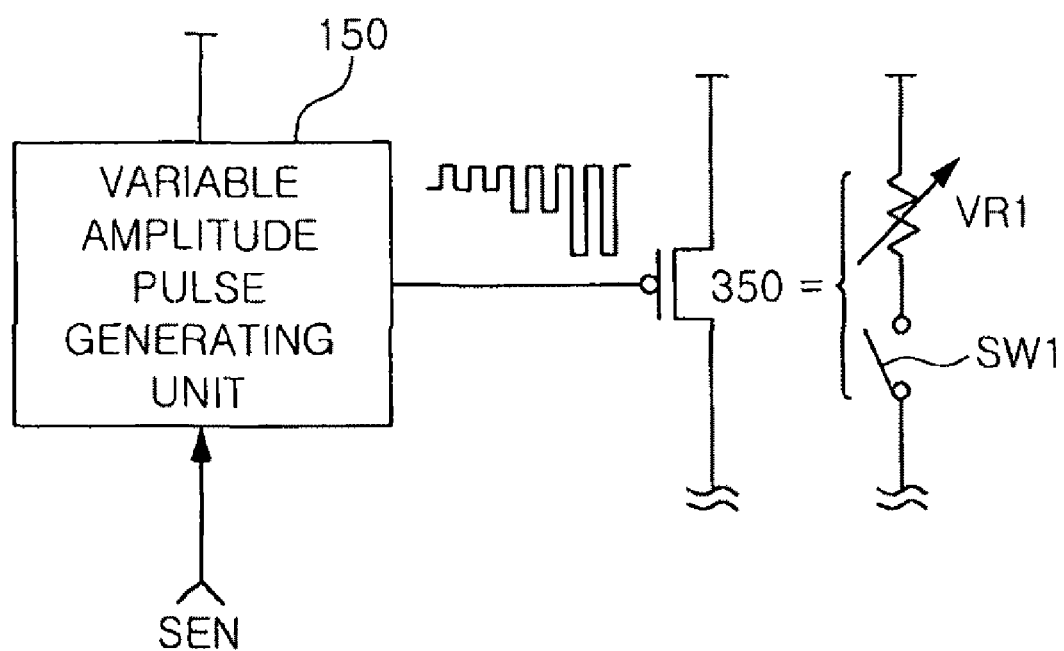
FIG. 10 is a diagram of a semiconductor integrated circuit, according to embodiments of the invention.

FIG. 10 is a diagram of a semiconductor integrated circuit according to an embodiment of the invention. With reference to FIG. 10, the semiconductor integrated circuit comprises a pulse generating unit 150 that generates a variable amplitude pulse in response to a switching enable pulse signal SEN which may be a time state signal Phase0, Phase1, or Phase2 to be described below and a switching variable resistance unit 350 that controls a current flowing to a supply voltage input terminal in response to the variable amplitude pulse. In an embodiment, the switching variable resistance unit 350 controls a current flowing to the supply voltage input terminal by switching between different electrical states. In an embodiment, the supply voltage input terminal becomes a source terminal of switching variable resistance unit 350. In an embodiment, the switching variable resistance unit 350 can be a MOS transistor, for example, as shown in FIG. 10, a PMOS transistor, wherein the PMOS transistor controls a current flowing to its source terminal in response to the variable amplitude pulse.

The variable amplitude pulse output from the pulse generating unit 150 has an amplitude that progressively changes to a greater voltage level over a period of time (see FIG. 12), the variable amplitude pulse being applied to a gate terminal of PMOS transistor 350. Thus, the PMOS transistor 350 can perform several different switching operations. In one switching operation, referred to as a "turnoff/slightly turn on operation," the PMOS transistor 350 in a first state is turned off or deactivated, and in a second state is "slightly turned on." In another switching operation, referred to as a "turnoff/intermediate turn on operation," the PMOS transistor 350 in a first state is turned off or deactivated, and in a second state is "intermediate turned on." In another switching operation, referred to as a "turnoff/fully turn on operation," the PMOS transistor 350 in a first state is turned off or deactivated, and in a second state is "fully turned on." The type of switching operation and the switching state of the PMOS transistor 350 is dependent on a period of time. Accordingly, the switching variable resistance unit 350 can simultaneously perform a function of a switch SW1 and a function of a variable resistor VR1, wherein a variable resistance value progressively decreases over time. In order to provide a circuit with a relatively simplified configuration, the switching variable resistance unit 350 comprises one MOS transistor, but may comprise two or three devices, such as MOS transistors. In other embodiments, the switching variable resistance unit 350 may comprise a NMOS transistor having a drain terminal that is coupled to the supply voltage input terminal and a gate terminal that receives the variable amplitude pulse.

Figure 11:
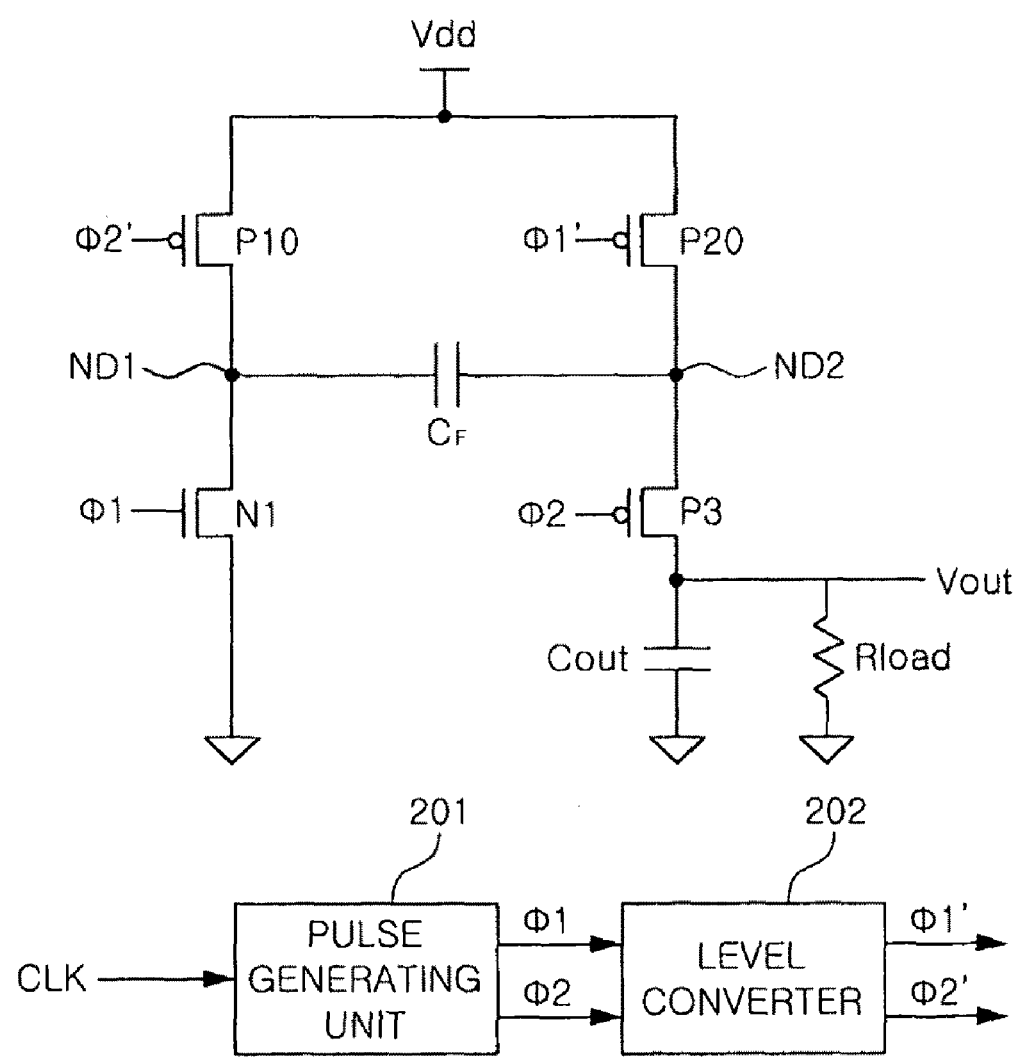
FIG. 11 is a circuit diagram of the charge pump employing a circuit similar to that of FIG. 10.
Figure 12:
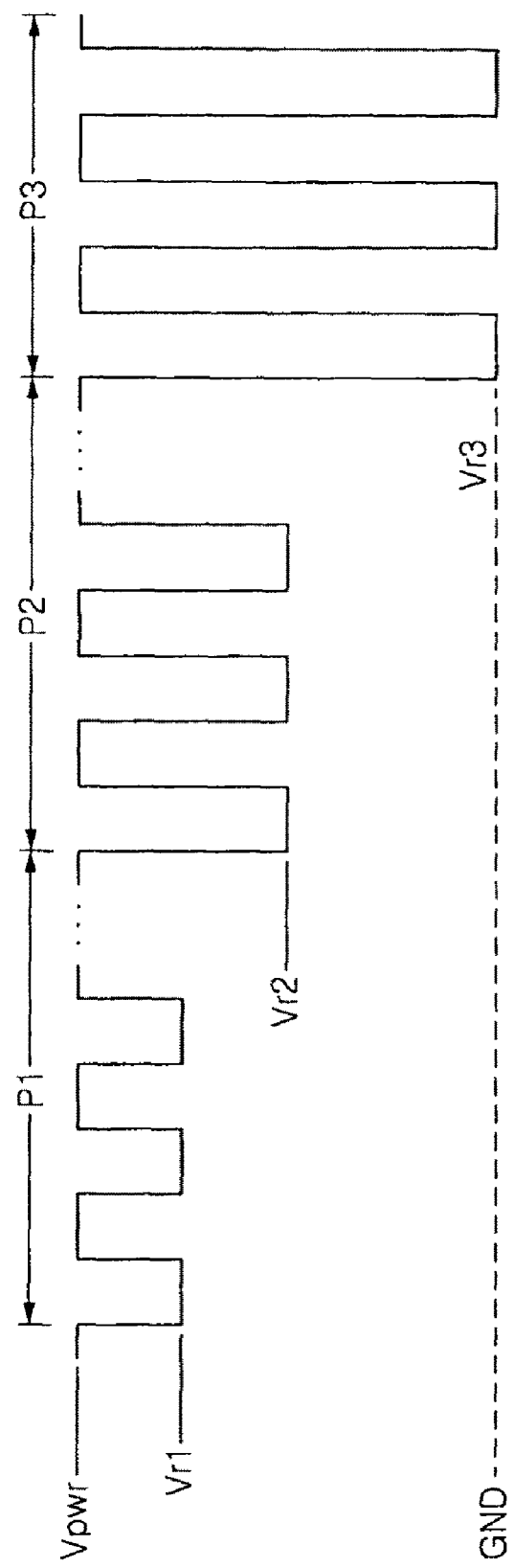
FIG. 12 is an graph illustrating a variable amplitude pulse output from a level converter of FIG. 11.

FIG. 11 is a circuit diagram of a charge pump employing a circuit of FIG. 10, and FIG. 12 is a graph illustrating a variable amplitude pulse output from a level converter of the charge pump of FIG. 11.

Referring to FIG. 11, a charge pump of a semiconductor integrated circuit comprises a supply voltage input terminal, which, in one embodiment, is a source terminal of at least one of a PMOS transistor P10 and a PMOS transistor P20 that each receive a supply voltage; a pulse generating unit 201 that receives an input clock CLK and generates first and second non-overlapping pulses Φ1 and Φ2 in response to the input clock CLK, and a level converter 202 that receives the first and second non-overlapping pulses Φ1 and Φ2 and generates corresponding first and second variable amplitude pulses Φ1' and Φ2' in response to the first and second non-overlapping pulses Φ1 and Φ2, respectively. The charge pump further comprises a first switching variable resistance unit P20 that controls a flow of current flowing to the supply voltage input terminal by switching between different electrical states in response to the first variable amplitude pulse Φ1' and a second switching variable resistance unit P10 that controls a flow of current flowing to the supply voltage input terminal by switching between different electrical states in response to the second variable amplitude pulse Φ2'. The charge pump further comprises a first capacitor $C_F$ coupled between output terminals ND1 and ND2 of the first and second switching variable resistance units P20 and P10, a first switching unit N1 coupled between the output terminal ND1 of the second switching variable resistance unit P10 and a ground, and generates a signal in response to the first non-overlapping pulse Φ1, a second switching unit P3 coupled between the output terminal ND2 of the first switching variable resistance unit P20 and a load output terminal Rload, and generating a signal in response to the second non-overlapping pulse Φ2, and a second capacitor Cout coupled in parallel with the load output terminal Rload between the second switching unit P3 and the ground.

In FIG. 11, the first and second switching variable resistance units P20 and P10 are comprised of first and second PMOS transistors, respectively, the transistors having source terminals that are coupled in common to the supply voltage input terminal and gate terminals receiving the first and second variable amplitude pulses Φ1', Φ2', respectively and switch and variably limit a current flowing into the supply voltage input terminal. In an embodiment, the first and second PMOS transistors P20 and P10 individually correspond to the PMOS transistor 350 of FIG. 10.

In an embodiment, the first switching unit N1 is comprised of an NMOS transistor, and the second switching unit P3 is comprised of a PMOS transistor. During an operation, the NMOS transistor N1 is turned on when the first non-overlapping pulse Φ1 is activated, and the PMOS transistor P20 simultaneously performs a switching operation and an operation of variable resistance when the first variable amplitude pulse Φ1' is activated. In an initial operation of the abovementioned operation, the PMOS transistor P20 repetitively performs the abovementioned turnoff/slightly turn on operation in response to the first variable amplitude pulse Φ1'.

Thus, the capacitor $C_F$ along a current path between PMOS transistor P20 and NMOS transistor N1 begins to slowly charge, the current path being similar to the current path PA2 shown in FIG. 9. At this time, inrush current entering the charge pump shown in FIG. 11 is substantially limited by a relatively great on-resistance of the PMOS transistor P20. Accordingly, in the initial operation requiring a relatively small amount of switching current, a current is limited by using a resistance device having a relatively great value, and thus the inrush current to the charge pump is substantially reduced and a power supply part of a battery, for example, is not burdened, thereby substantially reducing an influence on other adjacent circuits that may be otherwise affected by the burdened battery.

On the other hand, PMOS transistor P3 is turned on when the second non-overlapping pulse Φ2 is activated, and PMOS transistor P10 simultaneously performs a switching operation and an operation of variable resistance when the second variable amplitude pulse Φ2' is activated. At this time, in the initial operation, the NMOS transistor N1 and the PMOS transistor P20 enter a turnoff state. The PMOS transistor P10 repetitively performs the abovementioned turnoff/slightly turn on operation states in response to the second variable amplitude pulse Φ2'. Accordingly, a current path similar to the current path PA1 in FIG. 9 is formed between PMOS transistors P10 and P3, and, since the PMOS transistor P3 is activated, an output capacitor Cout begins to be charged to twice the power source voltage appearing on an output node ND2 of the capacitor $C_F$. At this time, inrush current entering the charge pump shown in FIG. 11 through the current path is substantially limited by a relatively great on-resistance of the PMOS transistor P10.

In a middle-period operation after a small charge has been provided to the capacitor Cout, the NMOS transistor N1 is turned on when the first non-overlapping pulse Φ1 is activated, and the PMOS transistor P20 simultaneously performs a switching operation and a variable resistance operation when the first variable amplitude pulse Φ1' is activated. Here, the PMOS transistor P20 repetitively enters the abovementioned turnoff and intermediately turn on states in response the first variable amplitude pulse Φ1'. A charge is provided to the capacitor $C_F$ along a current path similar to current path PA2 in FIG. 9. At this time, inrush current entering the charge pump through the current path is limited to an approximately intermediate level by an on resistance of the PMOS transistor P20 being adjusted to an approximately intermediate level. Therefore, while the middle-period operation requires some level of switching current, a current applied to the PMOS transistor P20 is limited by using the PMOS transistor P20 having an approximately intermediate resistance value, thereby limiting the inrush current to its corresponding level.

On the other hand, the PMOS transistor P3 and the PMOS transistor P10 perform an operation in response to the second variable amplitude pulse Φ2' and the second non-overlapping pulse Φ2 in the middle-period operation. At this time, the PMOS transistor P10 repetitively enter the abovementioned turnoff/intermediate turn on operation in response to the second variable amplitude pulse Φ2'. Accordingly, a current path similar to current PA1 shown in FIG. 9 is formed, and a charge discharged from the capacitor $C_F$ is charged by a considerable level into the output capacitor Cout. In this case, the inrush current entering the charge pump through the current path PA1 is limited corresponding to an approximately intermediate on-resistance value of the PMOS transistor P10.

When in a final-stage operation capacitor Cout has been completely charged, the NMOS transistor N1 is turned on when the first non-overlapping pulse Φ1 is activated, and the PMOS transistor P20 simultaneously performs a switching operation and a variable resistance operation, when the first variable amplitude pulse Φ1' is activated. The PMOS transistor P20 repetitively enters the abovementioned turnoff fully turn on operation in response to the first variable amplitude pulse Φ1'. In this case, inrush current is seldom generated. Accordingly, in the final-stage operation requiring a relatively large amount of current, a current is limited by a minimal level by using a resistance device having a minimum resistance value.

On the other hand, when the PMOS transistor P3 is turned on when the second non-overlapping pulse Φ2 is activated in a final-stage operation, the PMOS transistor P10 simultaneously performs a switching operation and a variable resistance operation when the second variable amplitude pulse Φ2' is activated, and the PMOS transistor P10 repetitively enters the turnoff/fully turn on operation in response to the second variable amplitude pulse Φ2'. In this case, inrush current is seldom generated. As a result, in the final-stage operation, the charge pumping operation is normalized, and a current flowing through the current path between PMOS transistors P10 and P3 is limited by a minimal level by using a resistance device having a relatively minimum resistance value.

As described above, MOS transistors P10 and P20 of FIG. 11 functioning similarly to the switching variable resistance unit 350 of FIG. 10 can each simultaneously perform a switching operation and a variable resistance operation, whereby a variable resistance value is progressively reduced during the operation, thereby effectively limiting an inrush current that enters the circuit in the initial operation of the operation.

In an embodiment, the charge pump of FIG. 11 can be adapted to a DC-DC converter of a mobile communication terminal or a DC converter of portable electronic devices, for example, the DC-DC converter shown in FIG. 3.

As shown in FIG. 12, the first and second variable amplitude pulses Φ1', Φ2' generated by the level converter 202 coupled to the pulse generating unit 201 have a progressively increasing amplitude, i.e., from Vr1 to Vr3.

Also, as shown in FIG. 12, a maximum amplitude and a minimum amplitude of the first and second variable amplitude pulses Φ1', Φ2' correspond to a level Vpwr of a supply voltage and a level GND of a ground voltage, respectively, and are generated as an amplitude to enable the variable resistance values of the first and second switching variable resistance units to progressively become smaller during periods P1-P3. In detail, in FIG. 12, the x-axis is a time axis and the y-axis includes a range of voltage levels. At a time period P1, the first and second variable amplitude pulses Φ1' and Φ2' swing between a supply voltage level Vpwr and a first determination voltage level Vr1. This pulse pattern in time period P1 is substantially applied to the charge pump to maximally limit the inrush current in the initial operation state of the charge pump.

At a time period P2, the first and second variable amplitude pulses Φ1' and Φ2' swing between a supply voltage level Vpwr and a second determination voltage level Vr2. This pulse pattern is applied to limit the inrush current to a given level in the middle-period operation state of the charge pump.

At a time period P3, the first and second variable amplitude pulses Φ1' and Φ2' swing between a level Vpwr of supply voltage and a third determination voltage level Vr3. In an embodiment, the third determination voltage level Vr3 is approximately the same as a ground voltage GND. This pulse pattern is applied to substantially obtain a maximal switching current, whereby the inrush current is nearly unlimited.

Figure 13:
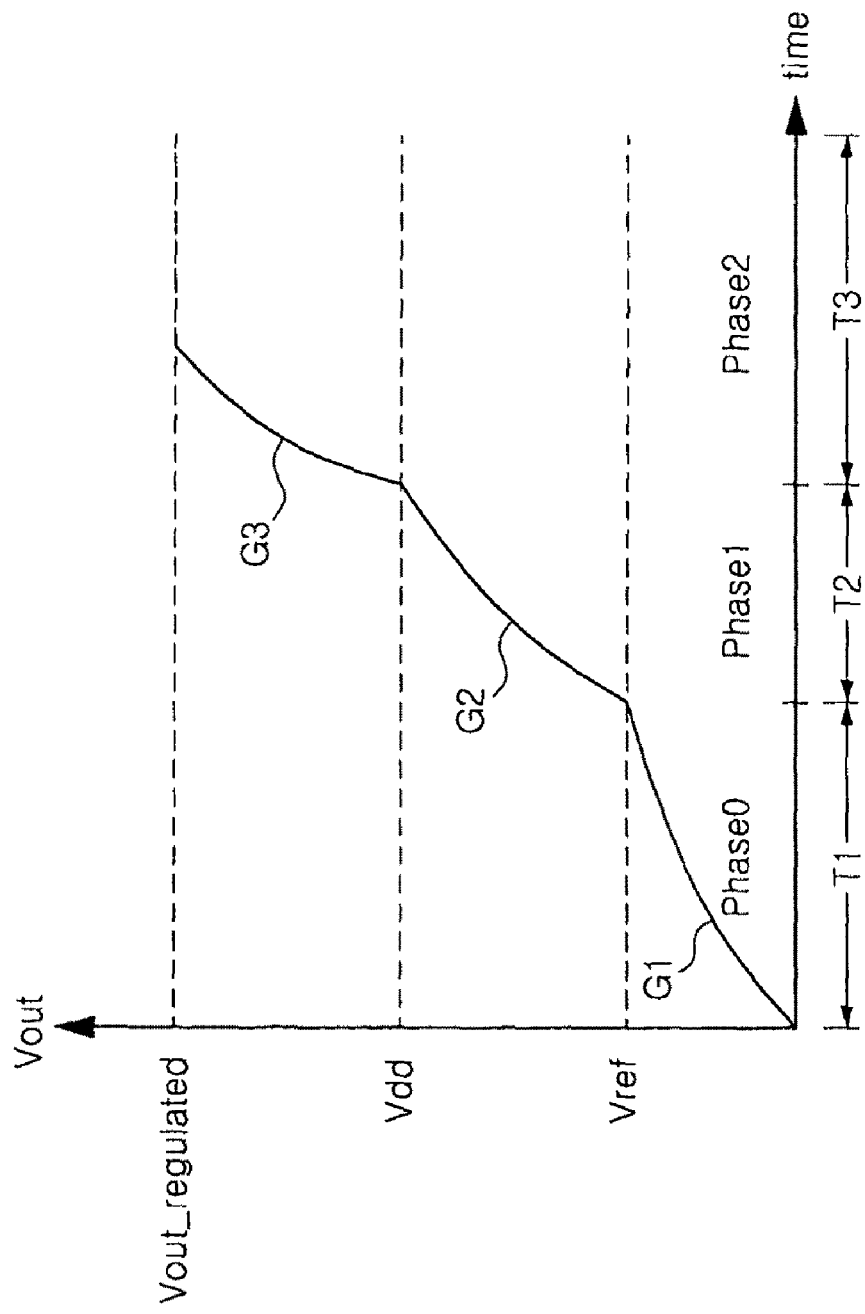
FIG. 13 is a graph illustrating a step-up output of FIG. 11 during different time periods of an operation.

FIG. 13 is a graph illustrating a variation in the output voltage Vout of FIG. 11 over time in an initial operation of the charge pump.

In an embodiment of the invention, a time state signal is categorized into three kinds of signals depending on the time period (T1, T2, or T3) and the first and second variable amplitude pulse patterns, for example, pulse patterns P1, P2 shown in FIG. 12.

In FIG. 13, an x-axis indicates a range of time and a y-axis indicates a range of an output voltage Vout. Further, voltages Vref, Vdd, and Vout_regulated represent a predetermined reference voltage between the source voltage for the charge pump shown in FIG. 11 and the ground level, the source voltage for the charge pump shown in FIG. 11, and a regulated output voltage of the charge pump shown in FIG. 11, respectively. A first state graph G1 obtained at a time period T1 illustrates a change in output voltage as a result of a charge pumping operation that is performed by using the first and second variable amplitude pulses Φ1' and Φ2' generated at the time state period P1 of FIG. 12. In this case, a variable resistance value is at its highest value in order to limit inrush current or input surge current that can occur for example during power-up of an electrical device. Although three kinds of a time state signal are determined in FIG. 13, i.e., T1, T2, T2, in some embodiments, the time state signal may be determined as two kinds, or four kinds or more.

A second state graph G2 obtained at a time period T2 illustrates a change in output voltage as a result of a charge pumping operation that is performed by using the first and second variable amplitude pulses Φ1' and Φ2' generated at the time state period P2 of FIG. 12. In this case, a variable resistance value becomes an approximately intermediate level to limit the inrush current to an approximately intermediate level.

A third state graph G3 obtained at a time period T3 illustrates a change in output voltage as a result of a charge pumping operation that is performed by using the first and second variable amplitude pulses Φ1' and Φ2' generated at the time state period P3 of FIG. 12. In this case, a variable resistance value becomes a lowest level so that any current limiting is minimal or non-existent.

Accordingly, in contrast to conventional inrush limiting approaches, for example, shown in FIG. 5, the circuits described herein with regard to the embodiments of FIGS. 11-13 do not permit a corresponding drop in output voltage, which can result in shortcomings of circuit instability as described above.

Figure 14:
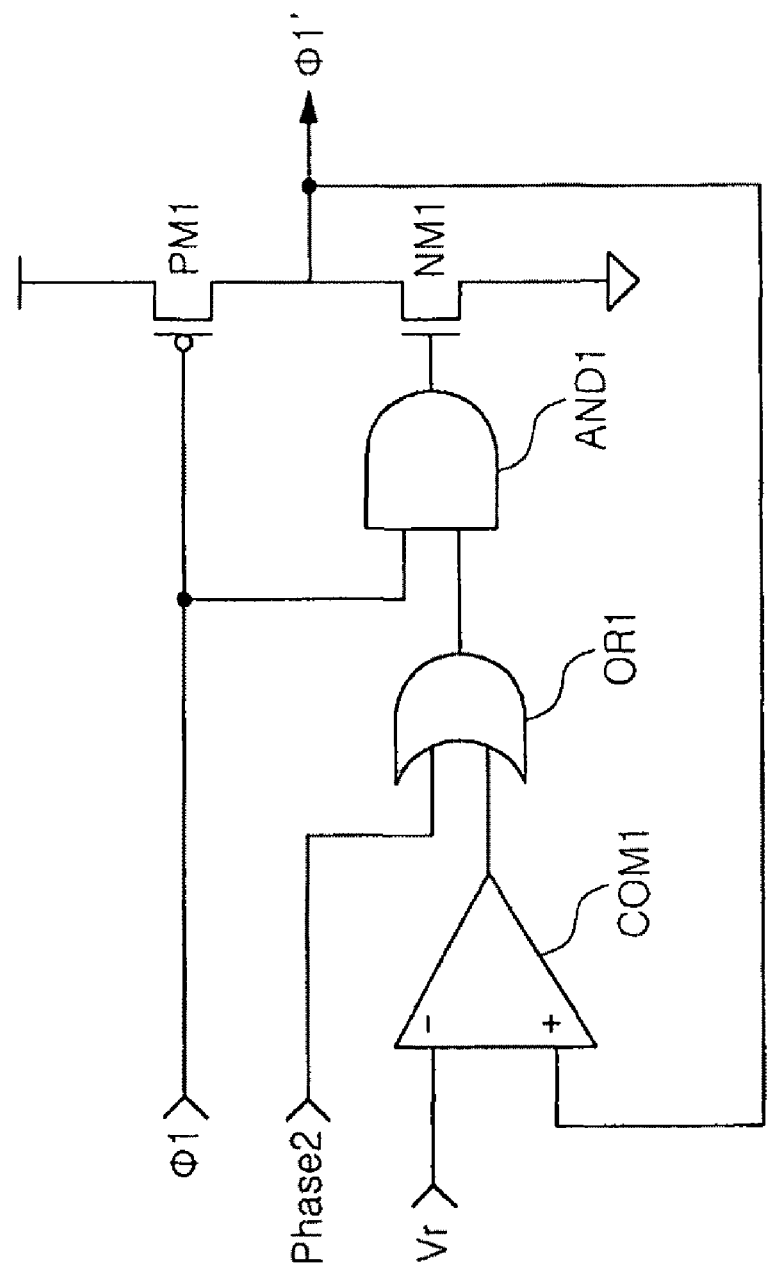
FIG. 14 is a diagram of the level converter circuit shown in FIG. 11.

FIG. 14 is a diagram of the level converter circuit shown in FIG. 11. In an embodiment, there is shown the configuration of a level converter generating a first variable amplitude pulse Φ1'. Although FIG. 14 illustrates the configuration of the level converter generating the first variable amplitude pulse Φ1', the level converter shown in FIG. 14 can similarly generate the second variable amplitude pulse Φ2'.

In FIG. 14, the level converter comprises a comparator COM1 that generates a comparison output by comparing an output feedback signal with a predetermined reference signal Vr, an OR gating unit OR1 that generates an OR signal by gating the comparison output of the comparator COM1 and a time state signal Phase0, Phase1, or Phase2, an AND gating unit AND1 that generates an AND response by gating the OR response and a first non-overlapping pulse Φ1 (or Φ2 if generating a second variable amplitude pulse Φ2') received from a pulse generating unit; a PMOS transistor PM1 applying a supply power to an output terminal in response to a first state of the first non-overlapping pulse; and an NMOS transistor NM1 whose drain-source channel is coupled between the output terminal and a ground and whose gate terminal receives the AND response.

Figure 15:
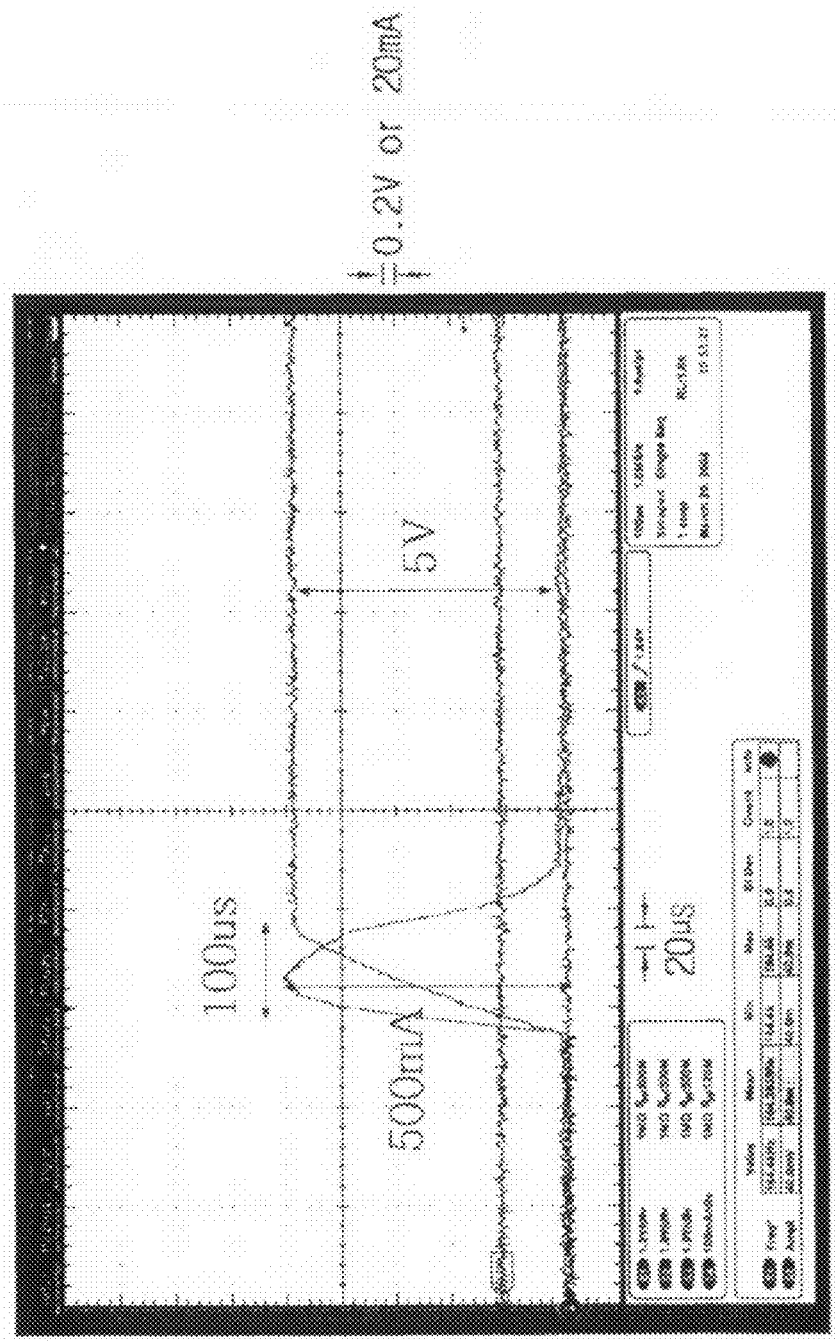
FIGS. 15 and 16 are measurement graphs, wherein an inrush current limiting effect referred to in FIG. 16 according to an embodiment of the invention is compared with an inrush current limiting effect on a conventional circuit referred to in FIG. 15.
Figure 16:
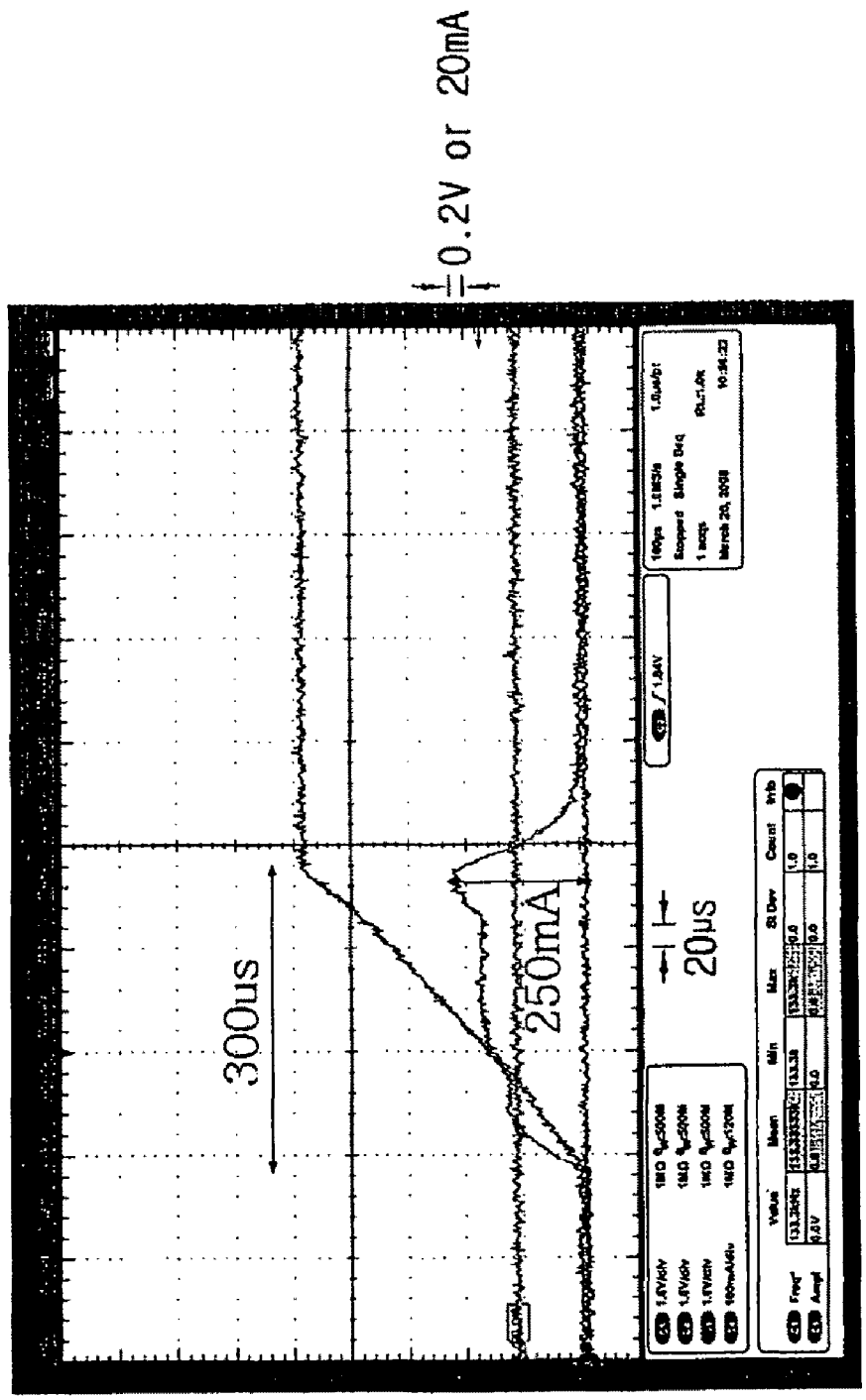

FIGS. 15 and 16 are measurement graphs obtained by comparing an inrush current limiting effect referred to in FIG. 16 according to an embodiment of the invention, with an inrush current limiting effect on a conventional circuit referred to in FIG. 15. In FIG. 16, response time taken to reach a normal output voltage is 300 μs longer than response time 100 μs shown in FIG. 15 by 200 μs, but a maximum ampere of inrush current shown in FIG. 16 (250 mA) is considerably reduced by approximately 250 mA as compared to the inrush current shown in FIG. 15 (500 mA). As described above, when the inrush current is cut in half approximately in this manner, an unstable initial operation can be mitigated.

In the drawings, an x-axis indicates time based on 20 microsecond increments, and a y-axis denotes voltage and current. Here, a voltage is provided in 0.2V increments, and a current is provided in 20 mA increments. Voltage and current are represented in digits in the drawings for understanding and comparison convenience.

As described above, according to some embodiments of the invention, an inrush current applied to a semiconductor integrated circuit or charge pump is limited, thereby substantially reducing an effect that a supply voltage supplied from a power supplier of battery etc. becomes temporarily unstable.

It will be apparent to those skilled in the art that modifications and variations can be made in the present invention without deviating from the inventive spirit or scope. Thus, it is intended that the present invention cover any such modifications and variations of this invention provided they come within the scope of the appended claims and their equivalents. For example, in other cases, a detailed configuration of switching variable resistance unit or a configuration of pulse generating unit generating a variable amplitude pulse, may be comprised of other devices besides the devices proposed in the embodiments described above. In addition, an electronic processing device may be portable electronic devices of HHP or PMP (Portable Multimedia Player), notebook computers, personal computers etc., and a semiconductor memory device may be a volatile memory of DRAM or SRAM etc. or NVM (Non-volatile Memory) of a flash memory, etc. Accordingly, these and other changes and modifications are seen to be within the inventive true spirit and scope as defined by the appended claims.

In the drawings and specification, there have been disclosed embodiments of the invention and, although specific terms are employed, they are used in a generic and descriptive sense only and not for limitation, the inventive scope being set forth in the following claims.

What is claimed is:

1. A charge pump for use in a semiconductor integrated circuit, comprising:
   a supply voltage input terminal that receives a supply voltage;
   a pulse generating unit that receives an input clock and generates first and second non-overlapping pulses in response to the input clock, and that generates first and second variable amplitude pulses that correspond to the first and second non-overlapping pulses, respectively;
   a first switching variable resistance unit that controls a current flowing into the supply voltage input terminal in response to the first variable amplitude pulse;
   a second switching variable resistance unit that controls the current flowing into the supply voltage input terminal in response to the second variable amplitude pulse;

a first capacitor coupled between output terminals of the first and second switching variable resistance units;

a first switching unit coupled between an output terminal of the second switching variable resistance unit and a ground, and responding to the first non-overlapping pulse;

a second switching unit coupled between an output terminal of the first switching variable resistance unit and a load output terminal, and responding to the second non-overlapping pulse; and a second capacitor coupled between the load output terminal and the ground.

2. The pump of claim 1, wherein the first and second switching variable resistance units each comprise first and second PMOS transistors having source terminals that are coupled in common to the supply voltage input terminal and gate terminals that each receive the first and second variable amplitude pulses.

3. The pump of claim 2, wherein the first and second PMOS transistors switch and variably limit the current flowing into the supply voltage input terminal.

4. The pump of claim 2, wherein the first and second variable amplitude pulses of the pulse generating unit have progressively increasing amplitudes.

5. The pump of claim 2, wherein the first switching unit comprises an NMOS transistor.

6. The pump of claim 5, wherein the second switching unit comprises a PMOS transistor.

7. The pump of claim 5, wherein the charge pump is employed in a DC-DC converter of a mobile communication terminal.

8. The pump of claim 2, wherein a maximum amplitude and a minimum amplitude of the first and second variable amplitude pulses of the pulse generating unit correspond to a supply voltage and a ground voltage, respectively, and are each generated having an amplitude to enable a variable resistance value of the first and second switching variable resistance units to become smaller during phases of an operation.

9. The pump of claim 5, wherein the charge pump is employed in a direct current converter of a portable electronic device.

10. The pump of claim 5, wherein the charge pump receives the supply voltage as an input and, in response, generates and sends a voltage twice that of the supply voltage to the load output terminal.

11. The pump of claim 2, wherein the first and second variable amplitude pulses are generated by a level converter, and wherein the level converter comprises:

a comparator that compares an output feedback signal with a predetermined reference signal, and, in response, generates a comparison output;

an OR gating unit that gates the comparison output and a time state signal, and, in response, generates an OR response;

an AND gating unit that gates the OR response and the first and second non-overlapping pulses and, in response, generates an AND response;

a PMOS transistor that applies a supply power to an output terminal in response to a first state of the first and second non-overlapping pulses; and an NMOS transistor having a drain-source channel that is coupled between the output terminal and the ground and a gate terminal that receives the AND response.

12. The pump of claim 11, wherein the time state signal includes at least three different predetermined time state signals.

* * * * *